March 21, 1967 H. HENKER ETAL 3,310,426

METHOD AND APPARATUS FOR PRODUCING SEMICONDUCTOR MATERIAL

Filed Oct. 2, 1963

United States Patent Office 3,310,426

Patented Mar. 21, 1967

3,310,426

METHOD AND APPARATUS FOR PRODUCING SEMICONDUCTOR MATERIAL

Heinz Henker and Theodor Rummel, Munich, Germany, assignors to Siemens & Halske Aktiengesellschaft, Berlin, Germany, a corporation of Germany Filed Oct. 2, 1963, Ser. No. 313,298
9 Claims. (Cl. 117—107.2)

Our invention relates to the production of hyperpure semiconductor material of polycrystalline or preferably monocrystalline constitution by thermal or pyrolytic precipitation of the semiconductor substance from a gaseous compound thereof. According to a well known method of this type, the gaseous semiconductor compound, mixed with hydrogen or another carrier gas, is passed along a carrier body consisting of the same semiconductor material, and the carrier body is heated to a sufficiently high temperature to cause thermal dissociation of the gaseous compound so that the resulting semiconductor substance precipitates upon the surface of the carrier body itself or upon discs, plates or the like substrates placed upon and heated from the carrier body.

Such thermal or pyrolytic dissociation methods for precipitating hyperpure semiconductor material upon carrier bodies or substrates of the same and likewise hyperpure material involve a number of problems: The reaction vessel is preferably made of a material which, like quartz, porcelain or sintered aluminum oxide ($Al_2O_3$) is not attacked by the reaction products. However, the current supply leads required for heating the carrier body must pass through the vessel wall. These leads normally consist of metal, and a satisfactory shielding of such metal leads from the reaction gases can be achieved only with difficulty. Furthermore, an appreciable temperature drop occurs between the relatively cold in-leads of metal or graphite on the one hand and the adjacent portions of the rod-shaped semiconductor carrier bodies being heated. If the temperature gradient is located substantially within the semiconductor rod itself, the dopant concentration of the rod must be low so that the electric current does not encounter an excessively high resistance in the cold portion. The required low dopant concentration is undesirable in many cases. The evolving reaction products also tend to dissolve the semiconductor material within a certain temperature range which, for example, is between 600 and 800° C. for silicon. Such dissolution causes the impurities contained in the semiconductor material to enter into the reaction gas and thence into the newly precipitating semiconductor material. If care is taken to have the temperature gradient occur within the contact terminals of the carrier body, such terminals consisting for example of graphite, then these terminals become heated so that impurities may evaporate therefrom and also enter into the reaction space where they become precipitated together with the semiconductor material upon the carrier body or the substrates located thereon.

It is an object of our invention to minimize and partly eliminate the above-mentioned difficulties.

To this end, and in accordance with a feature of the invention, we include the semiconducting carrier body serially in a loop circuit which is closed upon itself about the core or leg of a transformer so that by energizing the primary winding of the transformer a secondary voltage is induced in the loop which heats the carrier body to the temperature required for thermal dissociation of the surrounding gaseous atmosphere which contains a compound of the semiconductor substance, thus causing the liberated substance to precipitate upon the carrier body or upon individual discs, plates or other substrates placed upon and heated from the carrier body.

If the carrier body consists of a very high-ohmic and consequently extremely pure material, it is necessary to pre-heat the carrier body before applying transformation heating, assuming that the alternating current normally used is of conventional line frequency (50 or 60 c.p.s.). In such cases, therefore, it is preferable to energize the primary winding of the above-mentioned transformer from a high-frequency source, i.e. an alternating-voltage source of relatively high frequency which is a large multiple of the line frequency, so that the carrier body becomes pre-heated by a corresponding high-frequency current induced by this voltage in the secondary loop partly formed by the carrier body. After heating has been increased sufficiently so that the electric conductance of the carrier body is increased, the primary winding of the transformer is switched over to the normal voltage source of lower frequency, preferably line frequency, and the further heating of the carrier body and, respectively, the substrates placed upon the carrier body, is then performed with the aid of the low-frequency current.

It is further of advantage to connect ahead of the above-mentioned transformer a second transformer whose impedance ratio is variable so as to permit controlling and adapting of the secondary heating current to the changes in cross section and resistance of the carrier body that occur during pre-heating and during subsequent increase in diameter of the carrier body by the precipitating semiconductor substance.

For further explaining the invention, reference will be had to a preferred embodiment of an apparatus according to the invention illustrated by way of example on the accompanying drawing in which.

Figures 1, 2:
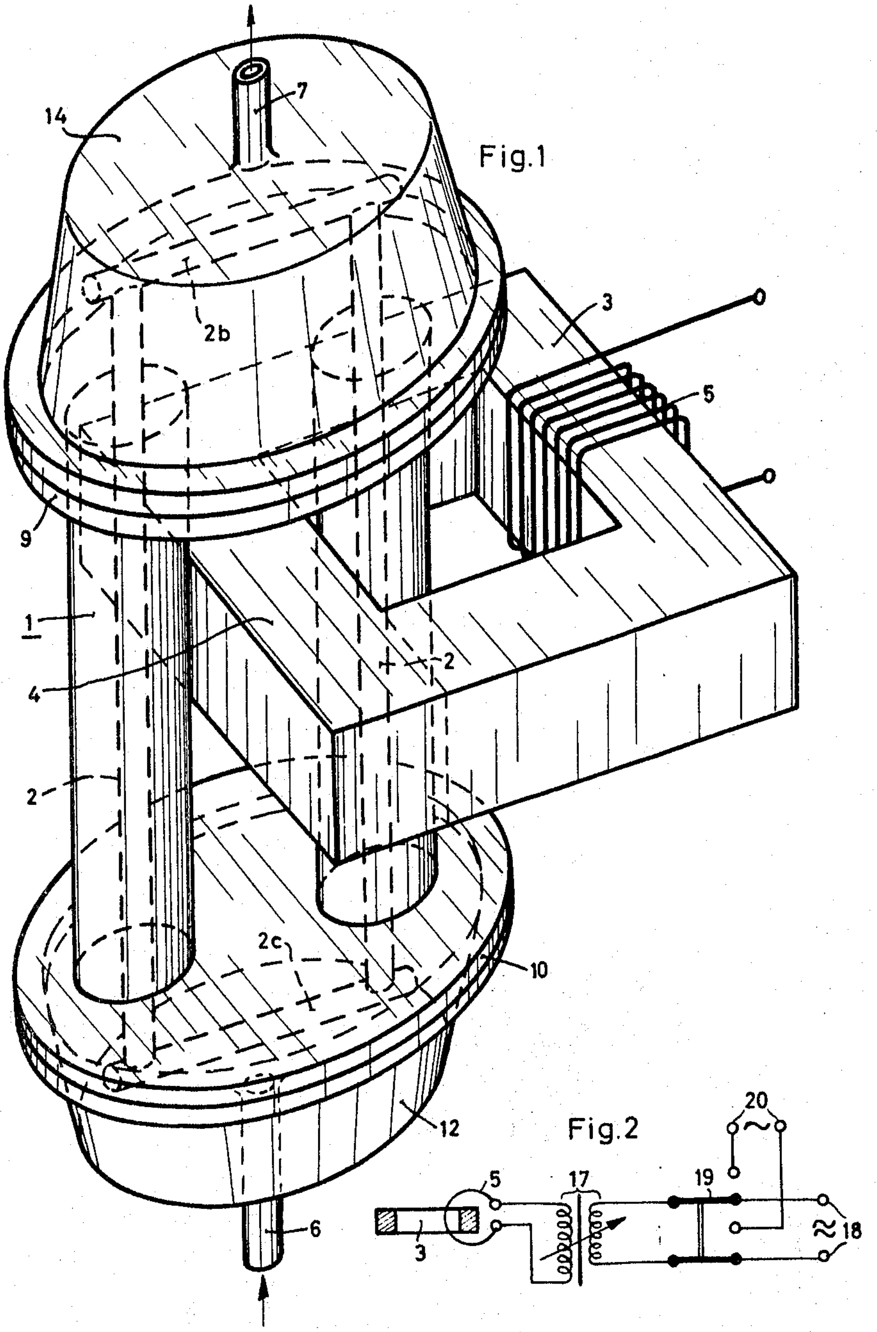
FIG. 1 is a perspective and schematic illustration of the apparatus.
FIG. 2 is an appertaining electric circuit diagram.

The illustrated apparatus comprises a processing vessel 1 which has the general shape of a closed ring or loop and consists, for example of quartz or quartz glass. Mounted within the processing vessel is a closed single-turn winding or loop which comprises two rod-shaped carrier bodies 2 consisting for example of silicon, although the method and apparatus are also applicable to germanium and other semiconductor materials. The same loop further comprises two transverse bridging pieces **2*b* and 2*c* preferably consisting of the same semiconductor material such as silicon. Each bridging piece rigidly connects the two adjacent ends of the parallel rods 2. The rods are suitably mounted within the processing vessel by holders (not illustrated) which may likewise consist of the same semiconductor material. The ring-shaped vessel structure surrounds a leg 4 of a transformer core 3 which carries a primary winding 5. During operation of the apparatus, the ends of the primary winding 5 are connected to an alternating voltage source. The varying induction flux passing across the transformer secondary winding constituted by the loop connection of the carrier bodies 2 and bridge pieces 2*b* and 2*c*, induces in this loop a voltage which drives a current through the carrier bodies 2, causing these bodies to be heated. The primary winding 5 of the transformer not only supplies the necessary power but also adjusts the effective impedance and the heating power to the resistance and temperature conditions of the carrier bodies. In cases where the impedance adjustment effected by the primary winding 5 is of itself insufficient, a control transformer 17 according to FIG. 2 is preferably connected between the alternating-voltage supply terminals and the primary winding 5. As shown in FIG. 2, an additional transformer 17 is connected to the terminals 18 of a high-frequency source through a selector switch 19. With the setting of the switch 19 shown in solid lines in FIG. 2 the variable-ratio transformer 17 permits adapting the excitation of primary winding 5 to the varying resistance of the carrier bodies 2 during the pre-heating period in which the conductance of the carrier bodies gradually increases. When the switch 19 is placed into a second position shown by dotted lines in FIG. 2, the primary winding 5 is connected through transformer 17 with the terminals 20 of the line-frequency source, and the transformer 17 is then available for adapting the heating power to the changes in resistance occurring in the carrier bodies 2 on account of their gradual increase in diameter caused by the continuing precipitation and growth of semiconductor material. Switch 19 is maintained in the second position during normal operation, that is during the subsequent duration of the growing process proper. Transformer core 3** may be cooled in the conventional manner, for example by air-cooling fins, radiation-protection sheets which shield the transformer from the glowing carrier bodies and the vessel, and/or also by water or oil cooling or with the aid of a blower.

After the carrier bodies have attained the desired temperature, for example about 1150° C. for silicon, a gaseous compound of the semiconductor substance, for example silico-chloroform, is supplied through a pipe 6 into the reaction vessel 1. A mixture of the gaseous compound with a carrier gas such as hydrogen is preferably used. The gas passes along the carrier bodies 2 within the leg portions of the processing vessel and is dissociated at the carrier surface forming silicon which precipitates upon the carrier in crystalline constitution. The residual gases leave the vessel through a pipe 7. If the carrier body or parts thereof consist of a monocrystal, then the precipitating material is grown upon the body or upon the monocrystalline parts thereof in likewise monocrystalline constitution. It is advisable when performing this method to heat the carrier bodies to glowing temperature in a gaseous atmosphere consisting of pure hydrogen prior to introducing the reaction-gas mixture into the vessel. If desired, gaseous doping substances or compounds thereof can be admixed to the reaction gas entering the vessel so as to produce p-n junctions in this manner.

It is of particular advantage when the parts used for mounting the carrier bodies within the reaction vessel likewise consist of the same semiconductor material, silicon for example. Since these mounting parts are not traversed by the electric current, they may consist of extremely pure material so that contamination of the precipitating semiconductor substance by these parts is reliably prevented. The inductively heated and generally ring-shaped processing vessel 1 is preferably constructed of nonmetallic parts. It preferably consists of two tubular legs which surround the respective rods 2 and are joined at the ends by flange plates 9 and 10. Each of these plates is flanged together with a cap 14 and 12 respectively by any suitable means such as by screws or bolts (not shown). The enclosed space within each cap thus provides communication between the two tubular leg portions of the vessel structure and also accommodates one of the two bridging pieces 2*b* and 2*c*. When the growing process is completed and the two carrier bodies have reached a desired ultimate thickness, the upper cap 14 and the lower cap 12 can be removed and the ring-shaped assembly of carrier bodies now rigidly grown together, can be cut apart with a saw, whereafter the long silicon rods can be drawn out in order to be further fabricated into electronic semiconductor devices.

The apparatus can also be used in a position turned 90° from the one shown on the drawing, and the method according to the invention can then be performed in this position. This is particularly advantageous if the carrier bodies are employed as heaters for discs or plates of semiconductor material which serve as substrates and are placed flat upon the top of the heater rods. By heating the carrier bodies, then preferably provided with a planar top surface for supporting the substrates, the latter are thus heated up to the pyrolytic temperature required for dissociation of the reaction gas. By adding suitable doping substances or their compounds to the reaction gas, p-n junctions and intrinsic zones can thus be produced in the substrates.

While the invention has been described above with particular reference to the production of silicon, it is analogously applicable to germanium and semiconductor compounds, for example silicon carbide or semiconductor $A^{III}B^{V}$ compounds.

To those skilled in the art it will be obvious upon a study of this disclosure that with respect to various details our invention permits of various modifications and can be given embodiments, other than particularly illustrated and described herein, without departing from the essential features of the invention and within the scope of the claims annexed hereto.

We claim:

1. The method of precipitating hyperpure semiconductor material by thermally dissociating a gaseous compound thereof with the aid of a heated carrier body of semiconductor material, which comprises including the semiconducting carrier body serially in a loop circuit closed upon itself about a transformer-core leg, subjecting the carrier body to an atmosphere of a gaseous semiconductor compound, inducing by transformer action a voltage in the loop circuit, and heating the carrier body by the resulting secondary loop current to the dissociation temperature required for precipitating semiconductor material upon the carrier body.

2. The method according to claim 1, which comprises applying a transformer primary voltage of relatively high frequency for preheating the carrier body, and thereafter applying a primary voltage of a given lower frequency and thereby maintaining the carrier body at the dissociation temperature.

3. The method of precipitating hyperpure semiconductor material by thermally dissociating a gaseous compound thereof with the aid of a heated carrier body of semiconductor material, which comprises placing semiconductor substrates upon a carrier body of semiconductor material, serially including the carrier body in a loop circuit closed upon itself about a transformer-core leg, subjecting the carrier body to an atmosphere of a gaseous semiconductor compound, inducing by transformer action a voltage in the loop circuit, and heating the carrier body with the substrates by the resulting loop current to the substrate temperature required for precipitation of semiconductor material.

4. Apparatus for precipitating hyperpure semiconductor material by thermally dissociating a gaseous compound thereof with the aid of a heated carrier body of semiconductor material, comprising a transformer core having a primary winding, a processing vessel having means for supplying a gaseous atmosphere containing a compound a semiconductor material to be precipitated, a carrier body of semiconductor material mounted in said vessel to be heated in said atmosphere to cause dissociation of the compound, a circuit loop serially including said carrier body and extending around said core so as to form a single-turn secondary winding of said transformer whereby said carrier body can be heated to the dissociation temperature by energizing said primary winding to induce secondary current in said loop.

5. Apparatus according to claim 4, comprising another transformer having a controllable primary-to-secondary impedance ratio and having an output circuit connected to said primary winding for varying the energization of said primary winding.

6. Apparatus for precipitating hyperpure semiconductor material by thermally dissociating a gaseous compound thereof with the aid of a heated carrier body of semiconductor material, comprising a transformer core having a primary winding, a generally ring-shaped processing vessel structure surrounding said core and having means for supplying thereto a gaseous atmosphere containing a compound of semiconductor material to be precipitated, a carrier body of semiconductor material to be heated in said atmosphere to cause dissociation of the compound, a circuit loop serially including said carrier body mounted in said vessel and extending together therewith around said core, whereby said carrier body can be heated to the dissociation temperature by energizing said primary winding to induce secondary current in said loop.

7. In apparatus according to claim 6, said processing vessel comprising two parallel leg portions of tubular shape and two end portions each joining said leg portions at the respective adjacent ends thereof and providing communication between said latter ends, said carrier body comprising two elongated parts extending longitudinally in said respective vessel leg portions, and said circuit loop having bridging pieces interconnecting said two carrier parts within said respective vessel end portions.

8. In apparatus according to claim 7, each of said two vessel end portions comprising a flange plate and a cap member flanged to said plate and forming together therewith an interspace in communication with the interior of said two vessel leg portions.

9. In apparatus according to claim 7, said carrier body and said bridging pieces consisting of the same semiconductor material as the one to be precipitated.

References Cited by the Examiner

UNITED STATES PATENTS

| | | | |
|---|---|---|---|
| 2,644,881 | 7/1953 | Schörg | 219—10.51 |
| 3,058,812 | 10/1962 | Ting Li Chu et al. | 118—49.1 |
| 3,171,755 | 3/1965 | Reuschel et al. | 118—49.5 |

FOREIGN PATENTS

| | | |
|---|---|---|
| 809,250 | 2/1959 | Great Britain. |

ALFRED L. LEAVITT, *Primary Examiner.*

A. ROSENSTEIN, *Assistant Examiner.*